US006669132B2

United States Patent
Nagata et al.

(10) Patent No.: US 6,669,132 B2
(45) Date of Patent: Dec. 30, 2003

(54) WEBBING RETRACTOR (75) Inventors: Tomonori Nagata, Niwa-gun (JP); Shinji Mori, Niwa-gun (JP); Yasuho Kitazawa, Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 107 days.

(21) Appl. No.: 09/940,061

(22) Filed: Aug. 28, 2001

(65) Prior Publication Data
US 2002/0023981 A1 Feb. 28, 2002

(30) Foreign Application Priority Data
Aug. 31, 2000 (JP) .................................. 2000-262629

(51) Int. Cl.$^7$ .............................................. B60R 22/28
(52) U.S. Cl. ................ 242/379.1; 280/807; 280/805
(58) Field of Search ................. 242/379.1; 280/806, 280/807, 805; 297/472, 478

(56) References Cited

U.S. PATENT DOCUMENTS 6,360,980 B1 * 3/2002 Lee .................... 242/379.1

FOREIGN PATENT DOCUMENTS

JP         8-127313        5/1996

* cited by examiner

Primary Examiner—John Q. Nguyen
(74) Attorney, Agent, or Firm—Nixon & Peabody, LLP (57) ABSTRACT Shear ribs are formed at a bottom portion of a fitting hole of a spool for positioning a lock base, and respective end portions of the positioning portion abuts on a shear rib. Further, ribs are formed between the shear ribs. When the spool rotates in an unwinding direction with respect to the lock base, the end portion of the positioning portion deforms and breaks a shear rib, a rib and then another shear rib in that order. By being able to combine the effects of energy absorption due to deformation of the ribs with that of energy absorption due to twisting deformation of the torsion bar, a force limiter load immediately increases as soon as the spool starts to rotate.

16 Claims, 6 Drawing Sheets

WEBBING RETRACTOR

BACKGROUND OF THE INVENTION

1. Field of the Invention

The present invention relates to a webbing retractor for tensioning a webbing belt in a direction in which a vehicle occupant is restrained when a vehicle speed is rapidly decreased, and more particularly, to a webbing retractor comprising a so-called force limiter mechanism for allowing the webbing belt to be pulled out by a predetermined amount and which absorbs energy when unwinding of the webbing belt is prevented.

2. Description of the Related Art

A webbing retractor forming a seat belt device of a vehicle is usually provided with a locking mechanism for locking a spool (a winding shaft) to prevent unwinding of a webbing belt when a vehicle speed is rapidly decreased.

An example of the locking mechanism comprises a lock base which is disposed coaxially with a spool and integrally coupled with the spool; and a locking means which engages with the lock base to prevent rotation of the lock base when a vehicle speed is rapidly decreased and thus indirectly prevents rotation of the spool.

In the webbing retractor such as described above, a so-called force limiter mechanism is provided for allowing a webbing belt to be pulled out by a predetermined amount to effect energy absorption when unwinding of the webbing belt is prevented. In an example of this force limiter mechanism, one end portion of a torsion bar disposed coaxially with the spool is fixed to the spool, and the other end portion thereof is integrally coupled with the above-described lock base. That is, in this type of force limiter mechanism, the spool is made to rotate relative to the lock base by locking the lock base with the locking means when the vehicle speed is rapidly decreased as well as by a tension applied to the webbing belt from the body of the vehicle occupant moving toward a front side of the vehicle when the vehicle speed is rapidly decreased. A rotating force of this relative rotation deforms the torsion bar in a direction in which the torsion bar is twisted, thereby absorbing energy and allowing rotation of the spool by the predetermined amount.

The above-described absorbed energy corresponds to a load (a force limiter load) applied to the webbing belt which increases in proportion to the unwound amount of the webbing belt (an amount of rotation of the spool) from when the spool begins to rotate up until the point where the spool has rotated by the predetermined amount. Therefore, the force limiter load is small when the spool begins to rotate. However, from a viewpoint of initial restraining performance when the vehicle speed is rapidly decreased, it is preferable to obtain a large force limiter load as soon as possible.

SUMMARY OF THE INVENTION

In view of the aforementioned, an object of the present invention is to provide a webbing retractor comprising a force limiter mechanism which can improve initial restraining performance.

In order to solve the aforementioned problems, according to the present invention, there is provided a webbing retractor comprising:

(a) a webbing belt;
(b) a rotatable spool for winding the webbing belt;
(c) a locking element provided at one axial-direction side of the spool for locking rotation of the spool in a webbing pay-off direction; and
(d) an energy absorbing structure comprising a torsion bar and a shear element and provided between the spool and the locking element for coupling the spool and the locking element so as to allow rotation of the spool in the pay-off direction under heavy strain.

In accordance with another aspect of the present invention, there is provided a retractor for a vehicle safety belt comprising:

(a) a housing;
(b) a ratchet provided at the housing;
(c) a spool rotatably attached in the housing for winding a webbing;
(d) a lock base provided at one axial-direction side of the spool coaxially with the spool and comprising a locking member which is engageable with the ratchet so as to lock rotation of the lock base; and
(e) an energy absorbing structure provided between the spool and the lock base for coupling the spool and the lock base so as to allow rotation of the spool in the webbing pay-off direction under heavy strain;

wherein, the energy absorbing structure comprises (i) a torsion bar having opposite ends, one of the opposite ends being fixed integrally at the spool, the other of the opposite ends being fixed integrally at the lock base; and (ii) a plurality of shear ribs disposed between the spool and the lock base and spaced apart from each other.

DESCRIPTION OF THE PREFERRED EMBODIMENTS

Figure 2:
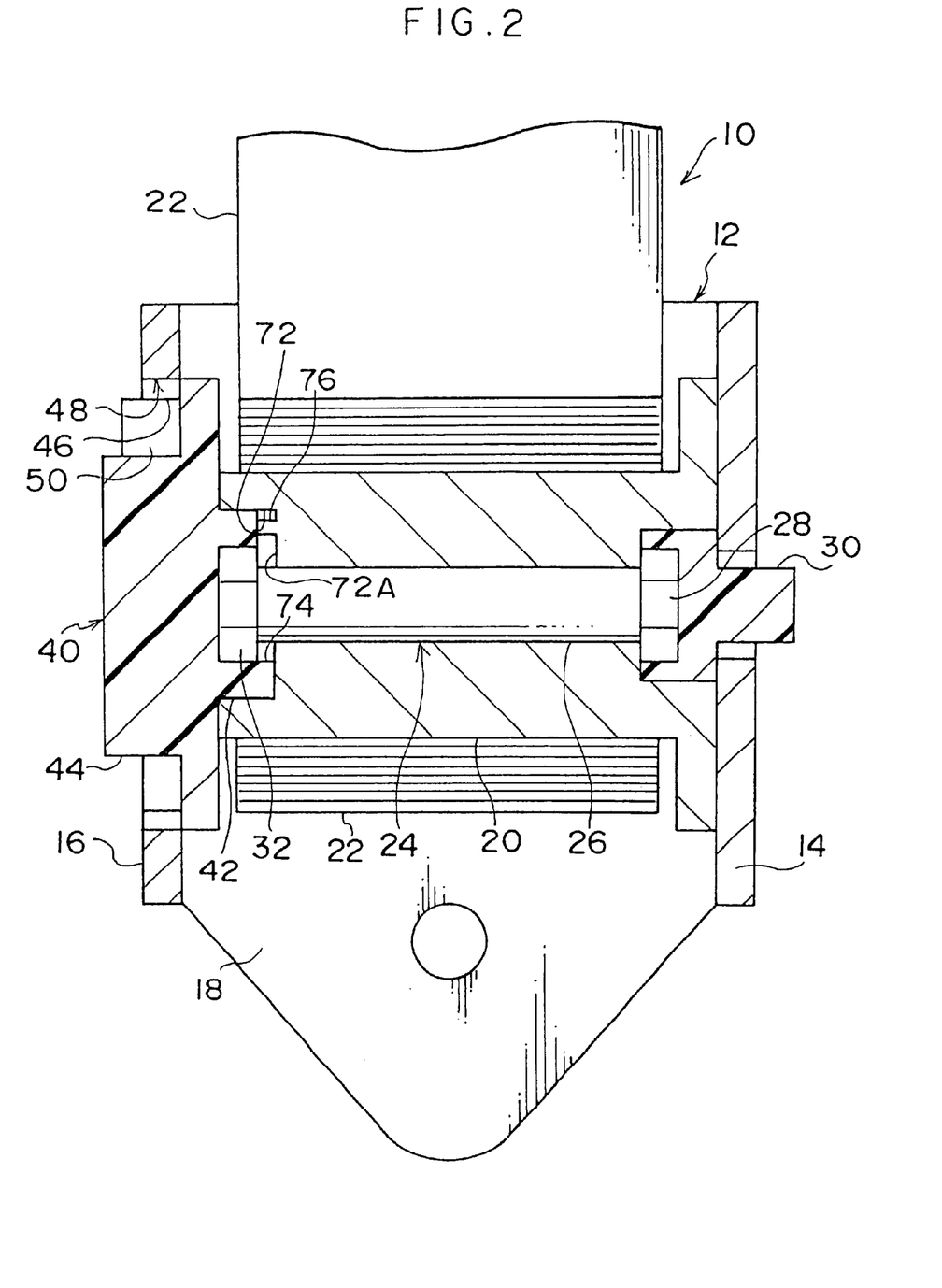
FIG. 2 is an elevational sectional view showing a structure of the webbing retractor according to the embodiment of the present invention.

FIG. 2 is an elevational sectional view showing a structure of a webbing retractor 10 according to the present invention. As shown in this figure, the webbing retractor 10 is provided with a frame 12. The frame 12 comprises a pair of plate-shaped leg plates 14 and 16 facing each other and a supporting plate 18 which joins width-direction one end portions of the leg plates 14 and 16 and is fixed at a side of a seat of a vehicle body by a fastening means such as bolts. The frame 12 as a whole is substantially U shaped when viewed from top.

A spool 20, which serves as a winding or take-up shaft and whose axial direction is the transverse direction of the supporting plate 18 (the direction in which the leg plate 14 and the leg plate 16 oppose one another), is provided between the leg plates 14 and 16 of the frame 12. The proximal end portion of an elongated, belt-shaped webbing belt 22 is anchored onto a portion of the outer periphery of the spool 20. Due to the spool 20 rotating in a take-up direction (the direction of arrow C1 in FIGS. 3 through 7), the webbing belt is taken-up in layers onto the outer peripheral portion of the spool 20. Due to the webbing belt 22 being pulled toward the distal end side thereof (which is the side not anchored to the spool), the spool 20 rotates in a pull-out or pay-off direction (which is opposite to the take-up direction of arrow C2 in the same figures), such that the webbing belt 22 taken-up on the spool 20 is pulled-out.

Note that, after the intermediate portion in the longitudinal direction of the webbing belt 22 passes through a slip joint of a shoulder anchor, which is provided in a vicinity of a center pillar of the vehicle, and then passes through a tongue plate, the distal end portion of the webbing belt 22 is fixed to a support body provided at the vehicle body. (Aforementioned members which are not denoted by reference numerals are not illustrated in the figures.)

The spool 20 has an overall shape like a hollow cylinder, and a torsion bar 24 is accommodated in the spool 20 coaxially therewith. The torsion bar 24 is provided with a bar main body 26 having a columnar shape. A fixing portion 28 which is substantially in a hexagonal pole shape is formed at a longitudinal-direction one end portion (at the leg plate 14 side) of the bar main body 26. The fixing portion 28 is integrally fixed to a sleeve 30 which is integrally fixed to the spool 20 at an axial-direction one end side (at the leg plate 14 side) of the spool 20.

Figure 1:
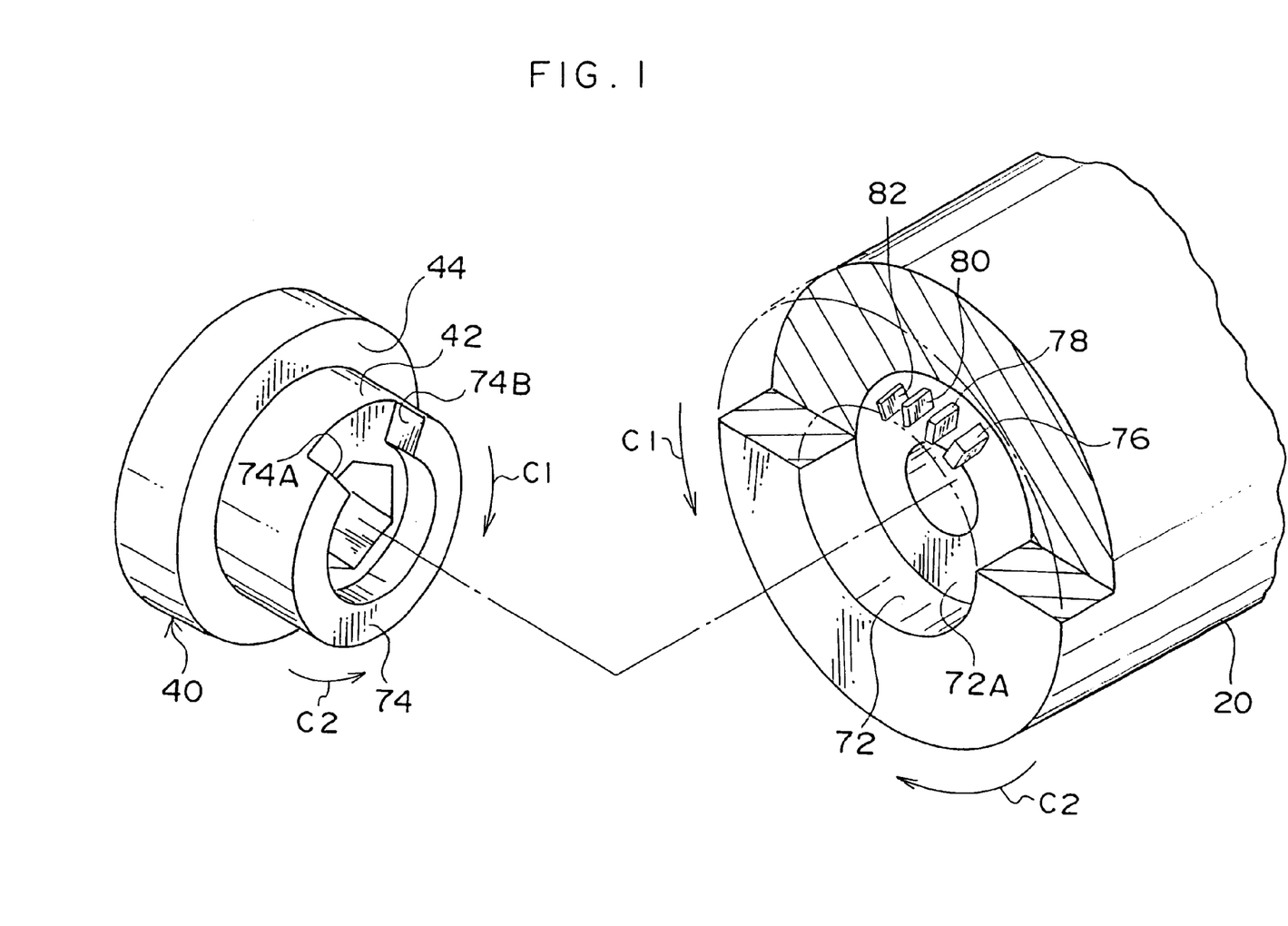
FIG. 1 is an exploded perspective view showing a structure of a main portion of a webbing retractor according to an embodiment of the present invention.
Figure 3:
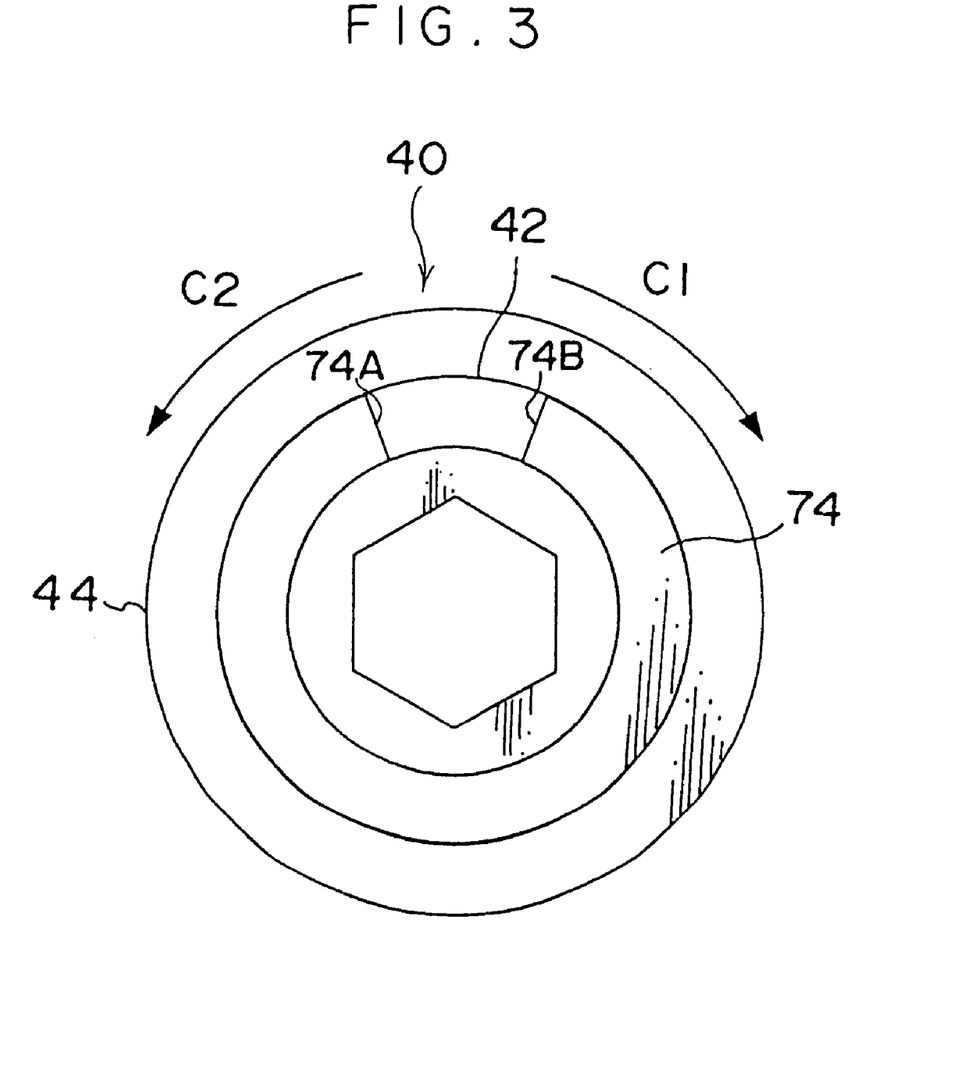
FIG. 3 is a view showing a lock base (a rotating body) viewed from a spool (a winding shaft) side.

A fixing portion 32 which is substantially in a hexagonal pole shape is formed at a longitudinal-direction other end portion (at the leg plate 16 side) of the bar main body 26. The fixing portion 32 is coupled to a lock base 40 which is disposed beside an axial-direction other end side (at the leg plate 16 side) of the spool 20 and serves as a rotating body. As shown in FIGS. 1 and 3, the lock base 40 is provided with a small diameter portion 42 which is substantially in a hollow cylindrical shape. The spool 20 has a fitting hole 72 having a circular sectional form formed at the axial-direction other end portion of the spool 20 coaxially with the spool 20. The small diameter portion 42 is fitted in the fitting hole 72. Since the small diameter portion 42 and the spool 20 are integrally coupled via the torsion bar 24, the small diameter portion 42 and the spool 20 usually rotate together.

A large diameter portion 44 having a diameter larger than that of the small diameter portion 42 is coaxially and integrally formed at an axial direction other end side (at the leg plate 16 side) of the small diameter portion 42. The large diameter portion 44 substantially coaxially pierces a substantially circular ratchet hole 48, which is formed at the leg plate 16 and has a ratchet 46 formed at an inner peripheral portion thereof (see FIG. 2).

As shown in FIG. 2, the large diameter portion 44 is provided with a locking member 50 which serves as a locking means. A V gear (not shown) is disposed coaxially with and in the vicinity of the large diameter portion 44. The V gear usually rotates together with the lock base 40 (large diameter portion 44). However, when the V gear and the lock base 40 make a relative rotation, a diameter of the locking member 50 on the large diameter portion 44 is extended and meshes with the ratchet 46 of the ratchet hole 48. Thus, the lock base 40 (large diameter portion 44) is locked (i.e., rotation thereof is restricted).

While, as shown in FIG. 1, a positioning portion 74 is formed at the small diameter portion 42. The positioning portion 74 is a hollow cylinder having the same outer and inner diameters as those of the small diameter portion 42, however a slot is partly formed at a portion in a peripheral direction thereof. Therefore, when viewed along an axial direction thereof, the positioning portion 74 is substantially in a C shape, unlike the small diameter portion 42 which is circular.

Figure 4:
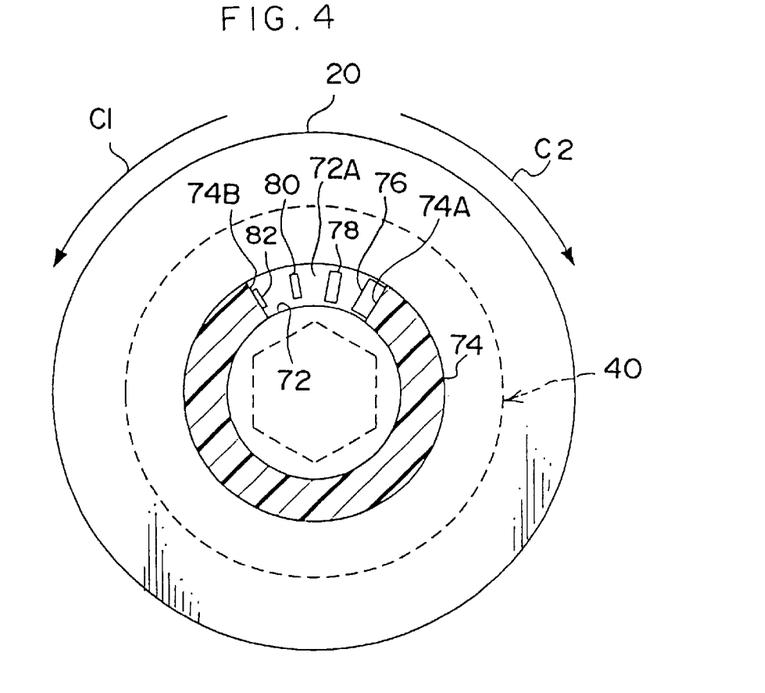
FIG. 4 is a view showing the spool (the winding shaft) viewed from the lock base (the rotating body) side.

As shown in FIGS. 1 and 4, at a corresponding position in the slot of the positioning portion 74, a substantially rectangular parallelopiped shear rib 76 is provided so as to stand from a bottom portion 72A of the fitting hole 72. The shear rib 76 serves as an absorption assisting means by being broken or shorn off. In a state in which the small diameter portion 42 is fitted in the fitting hole 72, a peripheral-direction one end portion 74A of the positioning portion 74 as an abutting portion abuts on an unwinding-direction side of the shear rib 76.

At a side opposite to the end portion 74A of the positioning portion 74 with respect to the shear rib 76, that is, at a retracting-direction side of the shear rib 76, a substantially rectangular parallelopiped rib 78, which forms an absorption assisting means as a portion to be shorn off, is provided so as to stand from the bottom portion 72A. An amount of protrusion of the rib 78 (i.e., a length from the bottom portion 72A along the axial direction of the spool 20) is about the same as that of the shear rib 76. While, a sectional area of the rib 78 taken along a direction perpendicular to the protruding direction is smaller than that of the shear rib 76. Further, since the shear rib 76 and the rib 78 are basically portions of the spool 20, the shear rib 76 and the rib 78 are made of the same material. Therefore, stiffness of the rib 78 is lower than that of the shear rib 76 because of the smaller sectional area thereof.

Further, at a side opposite to the shear rib 76 with respect to the rib 78, that is, at a retracting-direction side of the rib 78, a substantially rectangular parallelopiped rib 80, which forms an absorption assisting means as a shorn-off portion, is provided so as to stand from the bottom portion 72A. An amount of protrusion of the rib 80 is about the same as those of the shear rib 76 and the rib 78. While, a sectional area of the rib 80 taken along a direction perpendicular to the protruding direction is smaller than that of the rib 78. Further, since like the shear rib 76 and the rib 78, the rib 80 is basically a portion of the spool 20, the rib 80 is made of the same material as the shear rib 76 and the rib 78. Therefore, stiffness of the rib 80 is lower than that of the shear rib 78 because of the smaller sectional area thereof.

Furthermore, at a side opposite to the rib 78 with respect to the rib 80, that is, at a retracting-direction side of the rib 80, a substantially rectangular parallelopiped shear rib 82, which forms an absorption assisting means as a shorn-off portion, is provided so as to stand from the bottom portion 72A. In a state in which the small diameter portion 42 is fitted in the fitting hole 72, a peripheral-direction other end portion 74B of the positioning portion 74 as an abutting portion abuts on a retracting-direction side of the shear rib 82.

That is, the lock base 40 can insert the positioning portion 74 into the fitting hole 72 all the way to the bottom portion 72A only in a position in which the end portion 74A of the positioning portion 74 abuts on the unwinding-direction side of the shear rib 76 and the end portion 74B of the positioning portion 74 abuts on the unwinding-direction side of the shear rib 82. The lock base 40 is thus positioned with respect to the spool 20.

An amount of protrusion of the shear rib 82 is about the same as that of the shear rib 76, the rib 78 and the rib 80. While, a sectional area of the shear rib 82 taken along a direction perpendicular to the protruding direction is smaller than that of the rib 80. Further, since the shear rib 82 is basically a portion of the spool 20 like the shear rib 76, the rib 78 and the rib 80, the shear rib 82 is made of the same material as the shear rib 76, the rib 78 and the rib 80. Therefore, stiffness of the shear rib 82 is lower than that of the rib 80 because of the smaller sectional area thereof.

In the present embodiment, the shear ribs 76 and 82, and the ribs 78 and 80 have the substantially rectangular parallelopiped shape. However, shapes of the shear ribs 76 and 82, and the ribs 78 and 80 are not limited to the rectangular parallelopiped shape if only the ribs have the above-described, same stiffness order and the shear ribs 76 and 82 abut on the end portions 74A and 74B of the positioning portion 74.

Next, operation and effects of the present embodiment are described.

In a seat belt device comprising the webbing retractor 10, when the tongue plate, through which the longitudinal-direction middle portion of the webbing belt 22 is passed, is grasped and is pulled together with the webbing belt 22, the webbing belt 22 which is wound around the spool 20 is pulled out as the spool 20 rotates in the unwinding direction due to a tension applied to the webbing belt 22. Then, by engaging the tongue plate with a buckle device provided at the vehicle body and locking at a side opposite to the seat with respect to the webbing retractor 10, a webbing retractor state is effected, in which state a body of a vehicle occupant in the seat is restrained by the webbing belt 22.

In this state, when the speed of the vehicle is rapidly decreased and a detecting means such as an acceleration sensor detects the sudden reduction of speed, the above-described V gear is locked. In this state in which the vehicle speed is rapidly reduced, the body of the vehicle occupant begins to move toward a vehicle front side due to inertia, and the webbing belt 22 restraining the body of the vehicle occupant is tensioned by the body of the vehicle occupant moving toward the vehicle front side, thereby the spool 20 begins to rotate in the unwinding direction.

Since the spool 20 and the lock base 40 are integrally coupled via the torsion bar 24, the lock base 40 also attempts to rotate together with the spool 20. Thus, a relative rotation is caused between the V gear and the lock base 40, and the locking member 50 meshes with the ratchet 46 of the ratchet hole 48 formed at the leg plate 16 to block rotation of the lock base 40. As the rotation of the lock base 40 is blocked, rotation of the spool 20 together with the lock base 40 is indirectly blocked. Therefore, in this state, basically, the webbing belt 22 does not pull out from the spool 20, and the restraint of the body of the vehicle occupant by the webbing belt 22 is maintained to limit the movement of the body of the vehicle occupant toward the vehicle front side.

When the tension applied to the webbing belt 22 from the body of the vehicle occupant moving toward the vehicle front side exceeds a predetermined magnitude in the state in which the rotation of the lock base 40 is blocked by the locking member 50, the spool 20 makes a relative rotation in the unwinding direction with respect to the lock base 40 whose rotation is restricted by the locking member 50, and applies a force on the torsion bar 24 to rotate the torsion bar 24 in the unwinding direction. However, since the longitudinal-direction other end side of the torsion bar 24 is fixed to the small diameter portion 42 of the lock base 40, the torsion bar 24 cannot rotate in the unwinding direction at the longitudinal-direction other end side thereof. Therefore, the longitudinal-direction one end side of the torsion bar 24 attempts to make a larger rotation than the middle portion with respect to the other end side, and the torsion bar 24 is twisted as a result.

In this manner, while a twisting load which is used for twisting the torsion bar 24 is applied to the vehicle occupant through the webbing belt 22 as a force limiter load, the spool 20 is rotated in the unwinding direction with respect to the lock base 40, and the webbing belt 22 is pulled out, thereby effecting energy absorption.

While, as described above, when the spool 20 makes a relative rotation in the unwinding direction with respect to the lock base 40, the shear rib 76 formed at the bottom portion 72A of the fitting hole 72 of the spool 20 begins to rotate in the unwinding direction with respect to the positioning portion 74 formed at the small diameter portion 42 of the lock base 40, and presses the end portion 74A of the positioning portion 74 in the unwinding direction. Since the lock base 40 is locked as described above, the positioning portion 74 does not rotate even when the pressing force from the shear rib 76 is applied thereto.

Therefore, when the pressing force from the shear rib 76 is applied, the end portion 74A of the positioning portion 74 applies an equivalent pressing reaction force in the retracting direction to the shear rib 76, whereby the shear rib 76 is elastically deformed in the retracting direction. When the shear rib 76 is deformed to its elastic limit, the shear rib 76 is plastically deformed and is finally broken by the pressing reaction force from the end portion 74A of the positioning portion 74.

After the shear rib 76 has been broken, the spool 20 rotates twisting the torsion bar 24, and when the spool 20 has rotated by a predetermined angle, the rib 78 abuts on the end portion 74A of the positioning portion 74 (see FIG. 5), or alternatively, the shear rib 76 which has been broken and separated from the spool 20 is pressed by the rotating rib 78 and rotates to abut on the end portion 74A of the positioning portion 74.

Figure 5:
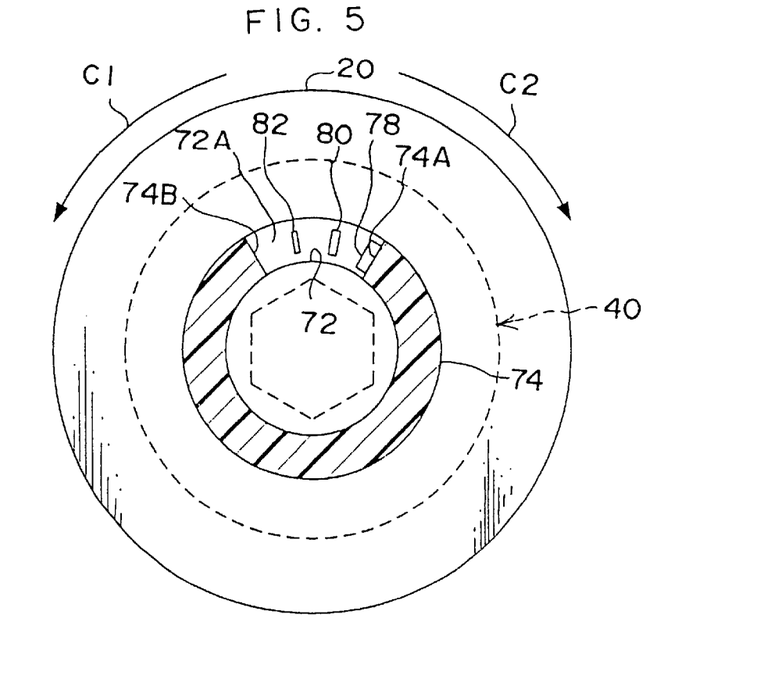
FIG. 5 is a view corresponding to FIG. 4, showing a state in which a shear rib (a portion to be shorn) has been shorn.
Figure 6:
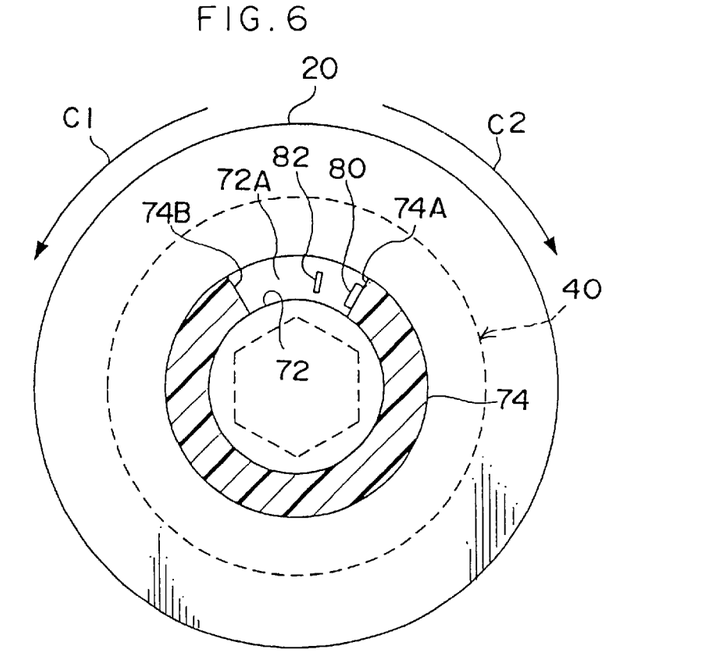
FIG. 6 is a view corresponding to FIG. 4, showing a state in which a rib (a portion to be shorn) has been shorn.

As the spool 20 still rotates in the unwinding direction, the rib 78 presses the end portion 74A of the positioning portion 74 in the unwinding direction directly or indirectly via the separated shear rib 76. As a result, the end portion 74A of the positioning portion 74 applies a pressing reaction force in the retracting direction, which is equivalent to the pressing force from the rib 78, to the rib 78 directly or indirectly via the separated shear rib 76, whereby the rib 78 is elastically deformed in the retracting direction. When the rib 78 is deformed to its elastic limit, the rib 78 is plastically deformed and is finally shorn by the pressing reaction force from the end portion 74A of the positioning portion 74.

After the rib 78 has been shorn, the spool 20 rotates twisting the torsion bar 24, and when the spool 20 has rotated by a predetermined angle, the rib 80 abuts on the end portion 74A of the positioning portion 74 (see FIG. 6), or alternatively, the rib 78 and the shear rib 76 which have been shorn and separated from the spool 20 are pressed by the rotating rib 80 and rotate to abut on the end portion 74A of the positioning portion 74.

Even in this state, the spool 20 still rotates in the unwinding direction. Therefore, the rib 80 presses the end portion 74A of the positioning portion 74 in the unwinding direction directly or indirectly via the separated rib 78 and shear rib 76. As a result, the end portion 74A of the positioning portion 74 applies a pressing reaction force in the retracting direction, which is equivalent to the pressing force from the rib 80, to the rib 80 directly or indirectly via the separated rib 78 and shear rib 76, whereby the rib 80 is elastically deformed in the retracting direction. When the rib 80 is deformed to its elastic limit, the rib 80 is plastically deformed and is finally shorn by the pressing reaction force from the end portion 74A of the positioning portion 74. After the rib 80 has been shorn, the spool 20 rotates twisting the torsion bar 24, and when the spool 20 has rotated by a predetermined angle, the shear rib 82 abuts on the end portion 74A of the positioning portion 74 (see FIG. 7), or alternatively, at least one of the rib 80, the rib 78 and the shear rib 76 which have been shorn and separated from the spool 20 is pressed by the rotating shear rib 82 and rotate to abut on the end portion 74A of the positioning portion 74.

Figure 7:
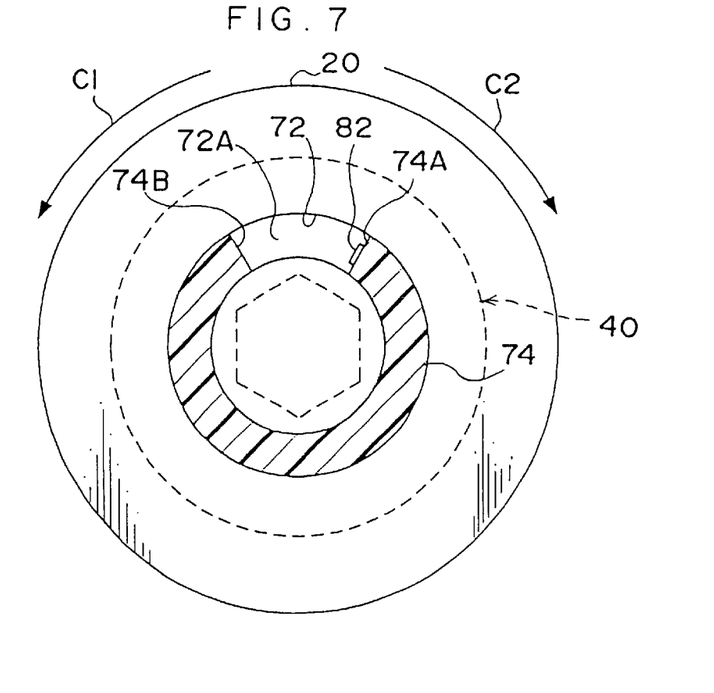
FIG. 7 is a view corresponding to FIG. 4, showing a state in which the last shear rib (a portion to be shorn) has been shorn.

Even in this state, the spool 20 still rotates in the unwinding direction. Therefore, the shear rib 82 presses the end portion 74A of the positioning portion 74 in the unwinding direction directly or indirectly via at least one of the separated rib 80, rib 78 and shear rib 76. As a result, the end portion 74A of the positioning portion 74 applies a pressing reaction force in the retracting direction, which is equivalent to the pressing force from the shear rib 82, to the shear rib 82 directly or indirectly via at least one of the separated rib 80, rib 78 and shear rib 76, whereby the shear rib 82 is elastically deformed in the retracting direction. When the shear rib 82 is deformed to its elastic limit, the shear rib 82 is plastically deformed and is finally shorn by the pressing reaction force from the end portion 74A of the positioning portion 74.

The load required for deforming each of the shear rib 76, the rib 78, the rib 80 and the shear rib 82 works on the vehicle occupant via the webbing belt 22. Therefore, a total force limiter load is a sum of the twisting load required for twisting the torsion bar 24 and the loads required for deforming the shear rib 76, the rib 78, the rib 80 and the shear rib 82.

Figure 8:
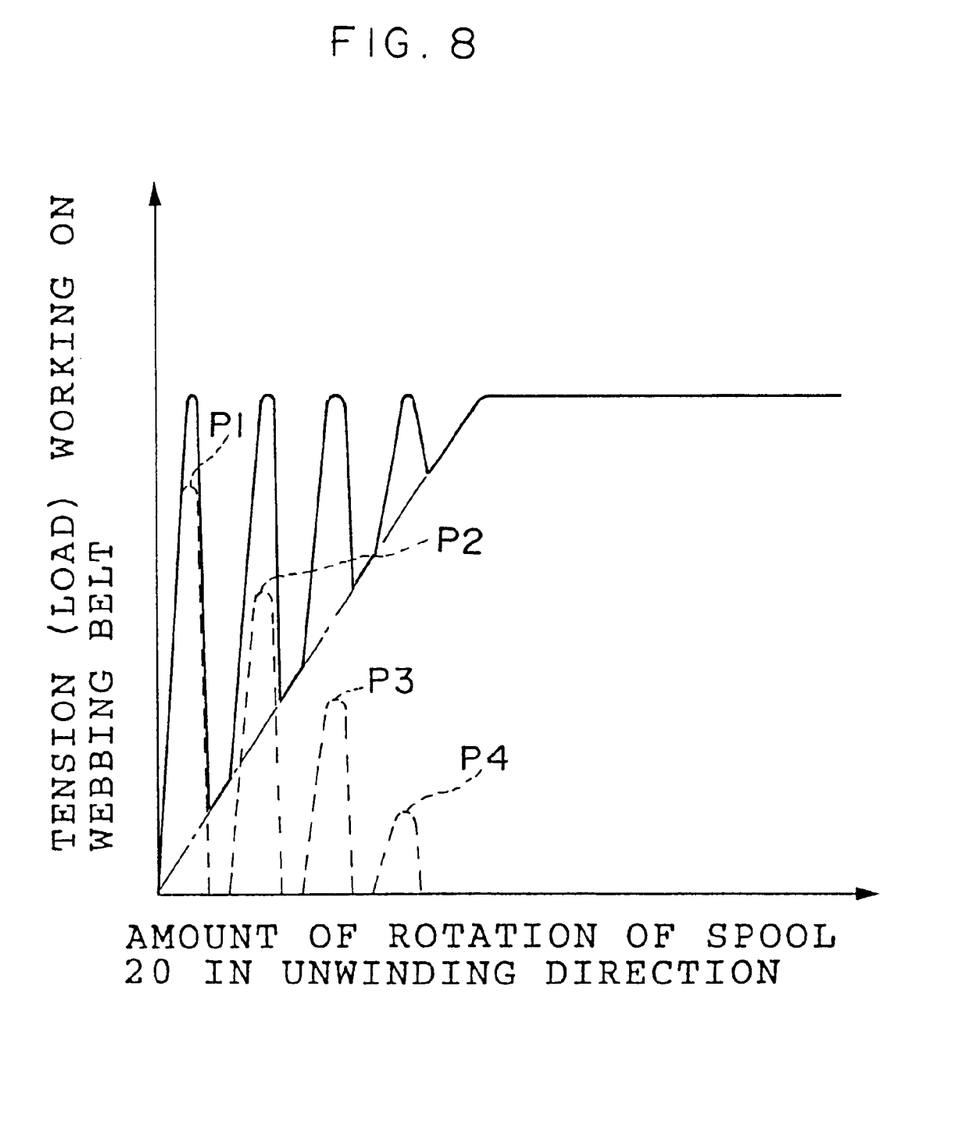
FIG. 8 is a graph showing a relationship between an amount of rotation of the spool (the winding shaft) and a tension (or a force limiter load) exerted on the webbing belt, with a broken line representing force only due to bias of the torsion bar, with dotted lines each representing force resulting from shearing off each rib, and with a solid line representing a characteristic curve in which the bias force of the torsion bar and the forces from shearing off the ribs are combined.

As shown by the broken line in FIG. 8, when the torsion bar 24 is twisted, a tension (or a force limiter load) is exerted linearly on the webbing belt according to the amount of spool rotation until the elastic limit of the torsion bar 24 is reached. The force limiter load does not change after the elastic limit has been reached. The torsion bar 24 begins to plastically deform until the torsion bar 24 is broken.

Of the dotted lines in FIG. 8, the peak designated by P1 represents the force limiter load up to the point when the shear rib 76 deforms. Since the above-described shear rib 76 abuts the end portion 74A of the positioning portion 74 in order to position the lock base 40 and the spool 20, it begins to deform as soon as the spool 20 begins to rotate. Thus, as shown by the solid lines in FIG. 8, immediately after the torsion bar 24 begins elastic deformation and thus when the twisting load is small, the load of the torsion bar is added to that load exerted due to the twisting, and therefore, an amount of absorbed energy immediately after the spool 20 begins to rotate, that is, immediately after the vehicle speed is rapidly decreased, can be increased, and an initial restraining performance when the speed of the vehicle is rapidly reduced, can be improved.

Further, after the shear rib 76 has been shorn off, the force limiter load for the deformation of the shear rib 76 is no longer exerted. However, while the torsion bar 24 is being elastically deformed, the load or energy resulting from the shearing of the rib 78 (the peak related thereto shown by the dotted line and designated by P2 in FIG. 8) can be added to that from twisting the torsion bar 24. Similarly, the load or energy from shearing off the rib 80 (the peak related thereto shown by the dotted line and designated by P3 in FIG. 8) and subsequently, the rib 82 (the peak related thereto shown by the dotted line and designated by P4 in FIG. 8) can be added to that from twisting the torsion bar 24. Therefore, a total amount of absorbed energy can be increased and the initial restraining performance at a time of rapid vehicle speed reduction can be improved.

Furthermore, amounts of absorbed energy by the shear rib 76, the rib 78, the rib 80 and the shear rib 82 correspond to respective stiffness thereof. As shown by the dotted lines in FIG. 8, the energy absorption due to the rib 76, 78, 80, and 82 are respectively smaller, i.e., the rib 78 absorbs less energy than the rib 76, the rib 80 absorbs less energy than the rib 78, and the rib 82 absorbs less energy than the rib 80. However, as described above, when the end portion 74A of the positioning portion 74 deforms the rib 78, the spool 20 has rotated further from the point at which the shear rib 76 has been deformed, and the absorbed energy by the twisting of the torsion bar 24 has been increased. Therefore, as shown in FIG. 8, there is no difference between a total amount of absorbed energy when the absorbed energy by the deformation of the shear rib 76 is added and that when the absorbed energy by the deformation of the rib 78 is added. This is the same for the rib 80 and the shear rib 82, and as a result, as shown by the solid lines in FIG. 8, the total absorbed energy represented by the solid line reaches about the same amount as the amount of absorbed energy when the elastic limit of the torsion bar 24 is reached in a short period. Thus, the initial restraining performance at the sudden vehicle speed reduction can be improved more effectively.

Although the shear ribs 76 and 82 and the ribs 78 and 80 are formed at the spool 20 and the positioning portion 74 is formed at the lock base 40 in the present embodiment, the shear ribs 76 and 82 and the ribs 78 and 80 may be formed at the lock base 40 and the positioning portion 74 may be formed at the spool 20. However, in this case, the shear ribs 76 and 82 and the ribs 78 and 80 are arranged in an order opposite to that in the present embodiment.

What is claimed is:

1. A webbing retractor comprising:
   (a) a webbing belt;
   (b) a rotatable spool for winding the webbing belt;
   (c) a locking element provided at one axial-direction side of the spool for locking rotation of the spool in a webbing pay-off direction; and
   (d) an energy absorbing structure comprising a torsion bar and a shear element including a plurality of spaced apart shear ribs provided between the spool and the locking element for coupling the spool and the locking element so as to allow rotation of the spool in the pay-off direction under heavy strain,
   said shear ribs being arranged to shear sequentially when the spool rotates in the pay-off direction, the first of said shear ribs having the largest shear resistance.

2. The webbing retractor according to claim 1, wherein the locking element comprises the shear ribs.

3. The webbing retractor according to claim 2, wherein the spool comprises an abutting portion for pressing the shear ribs to make them shear when the spool rotates in the pay-off direction.

4. The webbing retractor according to claim 1, wherein the shear ribs are formed integrally with the spool.

5. The webbing retractor according to claim 1, wherein the shear ribs are provided so as to extend axially from an axial cross section of the spool at one axial-direction side.

6. The webbing retractor according to claim 1, wherein the torsion bar is disposed in the spool coaxially with the spool when being assembled.

7. The webbing retractor according to claim 1, wherein areas of shear surfaces of the shear ribs are set such that the area of one which shears first is the largest, the area of one which shears next is the next largest and the area of one which shears last is the smallest.

8. The webbing retractor according to claim 1, wherein shear resistances of the shear ribs are set such that the shear resistance of one which shears first is the highest, the shear resistance of one which shears next is the next highest and the shear resistance of one which shears last is the lowest.

9. The webbing retractor according to claim 1, wherein the locking element comprises an abutting portion for pressing the shear ribs to make them shear when the spool rotates in the pay-off direction.

10. The webbing retractor according to claim 1, wherein the locking element comprises a positioning portion which engages with the shear ribs to enable mutual positioning.

11. The webbing retractor according to claim 1, wherein the torsion bar comprises opposite ends in an axial direction thereof, and one of the opposite ends is coupled with the locking element and the other of the opposite ends is coupled with the spool when being assembled.

12. A retractor for a vehicle safety belt comprising:

(a) a housing;

(b) a ratchet provided at the housing;

(c) a spool rotatably attached in the housing for winding a webbing;

(d) a lock base provided at one axial-direction side of the spool coaxially with the spool and comprising a locking member which is engageable with the ratchet so as to lock rotation of the lock base; and (e) an energy absorbing structure provided between the spool and the lock base for coupling the spool and the lock base so as to allow rotation of the spool in the webbing pay-off direction under heavy strain;

wherein, the energy absorbing structure comprises (i) a torsion bar having opposite ends, one of the opposite ends being fixed integrally at the spool, the other of the opposite ends being fixed integrally at the lock base; and (ii) a plurality of shear ribs disposed between the spool and the lock base and spaced apart from each other, said shear ribs being arranged to shear sequentially when the spool rotates in the webbing pay-off direction, wherein a first rib that shears has a higher shear resistance than any of the other shear ribs.

13. The retractor according to claim 12, wherein areas of shear surfaces of the shear ribs are set such that the area of one which shears first is the largest, the area of one which shears next is the next largest and the area of one which shears last is the smallest.

14. The retractor according to claim 12, wherein shear resistances of the shear ribs are set such that the shear resistance of the one which shears after the first rib is the next highest and the shear resistance of one which shears last is the lowest.

15. The retractor according to claim 12, wherein the shear ribs are provided so as to extend axially from an axial cross section of the spool at one axial-direction side, and the lock base comprises an abutting portion for pressing the shear ribs to make them shear when the spool rotates in the pay-off direction.

16. The retractor according to claim 12, wherein the torsion bar is disposed in the spool coaxially with the spool when being assembled.

* * * * *